G. P. FRICK.
Car Starter.

No. 108,127. Patented Oct. 11, 1870.

Witnesses.
S. M. Poole
Edmund Masson

George P. Frick,
By his atty A. B. Stoughton.

N. PETERS, PHOTO-LITHOGRAPHER, WASHINGTON, D. C.

United States Patent Office.

GEORGE P. FRICK, OF BALTIMORE, MARYLAND.

Letters Patent No. 108,127, dated October 11, 1870.

IMPROVEMENT IN DEVICES FOR STARTING STREET-CARS.

The Schedule referred to in these Letters Patent and making part of the same

*To all whom it may concern:*

Be it known that I, GEORGE P. FRICK, of the city and county of Baltimore, and State of Maryland, have invented certain new and useful Improvements in the Manner of Starting Street-Railroad Cars; and I do hereby declare the following to be a full, clear, and exact description of the construction and operation of the same, reference being had to the accompanying drawings making a part of the same, in which—

Similar letters of reference, where they occur in the several separate figures, denote like parts in all the drawings.

My invention relates to certain means and appliances for aiding the team in starting a street-car, as also, for locking or holding the car on an up-grade, to prevent it from running back or down such grade, when stopped for any purpose, and relieved of the force of draft of the team.

To enable others skilled in the art to make and use my invention, I will proceed to describe the same in connection with the drawings, first premising that some of the elements of my present improvement are found in a patent granted to me on the 7th day of June, 1859, and of course I lay no claim to them in this application, and further premising that I have shown two different modifications of devices, one applied to one end of the car, and the other to the opposite end thereof, for convenience in showing both arrangements, and describing their operation.

Figure 1:
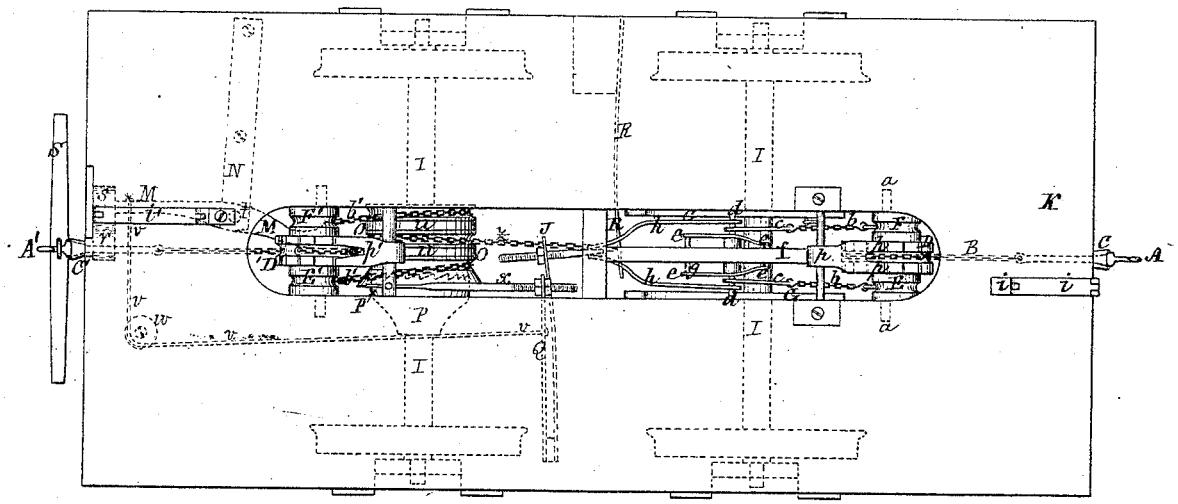
Figure 1 represents a top plan of the car and mechanism.
Figure 2:
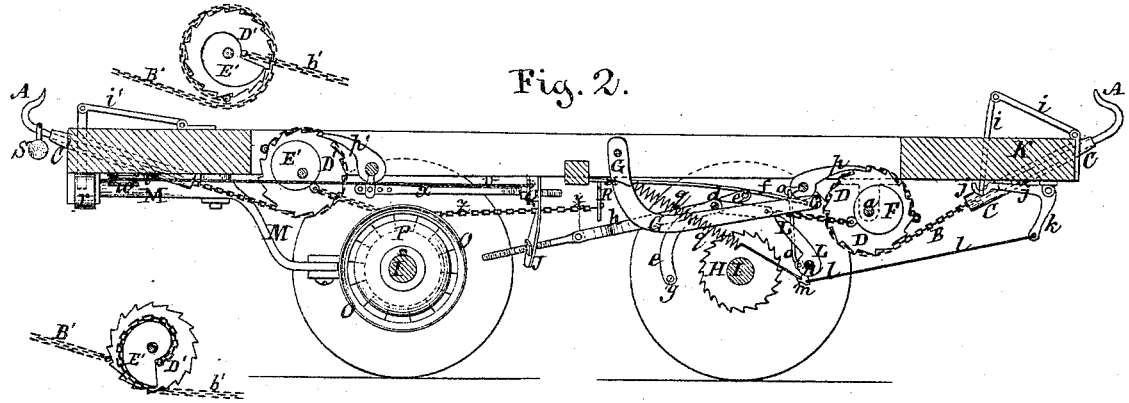
Figure 2 represents a section thereof in elevation.

The draft-bar or hook A, on the right of figs. 1 and 2, passes through a guide, c, and beyond this guide there is connected to it a chain, B, or other sufficiently strong and flexible connection, which passes around a ratchet-wheel, D, whose central and turning support is at a.

On this ratchet-wheel, or united to it, are two eccentrics, E F, that always turn with the ratchet-wheel, and, indeed, may be cast with it, one on each side of said ratchet; and to each eccentric there is connected a chain, b b, which, through the draw-bars c c, are ultimately connected to a shaft, d, which can move forward and back on the pivoted ways or guiding-rails G G.

The shaft d supports and carries a draw-pawl, e, the upper end of which is influenced by a spring, f, and the lower end of which has a round bar, g, in it, which takes into the ratchet-teeth in the wheel H, that is fast upon the axle I, and draws upon said ratchet to turn said axle, as will be hereafter explained.

On the shaft d there are also bars h h, which unite at or near their rear ends, and are there connected to a spring, J, which can be made adjustable thereto.

On the platform K of the car, there is pivoted a jointed treadle, i i, the free end of which passes through said platform, and by its fork or notch rests upon the arm j of a bell-crank lever, pivoted underneath said platform.

To the other arm k of the bell-crank, there is connected a rod, l, which extends back and is also attached to a projecting arm, m, on the hub of one of a pair of lifting toes, L, arranged on a rock-shaft, n, and which toes take under and elevate or depress the pivoted ways G, as the case may be.

To the hub of one of the toe-pieces L, there is attached a link or rod, o, which extends upward and is fastened to the heel of a dog or pawl, p, that takes into and acts in connection with the ratchets on the wheel D.

From the arm m, a spiral spring, q, extends to the frame or any other permanent part of the car, which spring returns the toe-pieces to their more vertical acting position, after they have been rocked downward by the driver in his ordinary position on the platform.

The heel of the dog or pawl p may also press upon the spring f, to throw it into more positive action with its ratchets.

The upper end of the sheath or guide C is flattened, or made conically flaring, and the drag-bar A, that occupies this portion of the sheath, is made correspondingly conical or wedge-shaped, so that whenever it is drawn into the sheath, it will be in such position as to keep the hook of the drag-bar upright, or so as to hold the tongue or double-trees.

The chain B, it will be observed by inspection of fig. 1, works or winds in a groove in the center of the ratchet-wheel D, so that the ratchet-teeth are on each side of the chain, making, as it were, two ratchets, while the dog or pawl p is forked, so as to straddle the chain and work in both ratchets.

The other chains, b b, one attached to each eccentric, are, as well as their eccentrics, placed one on each side of the ratchet-wheel, and at the same distances, about, from it. The object of this arrangement is to make or apply the power uniformly, and in the direction of the resisting point, and with uniform strain upon all the parts.

The operation of this mechanism is as follows:

Suppose the car to be standing at rest, and it is desirable to throw the mechanism into action to assist the team in starting the car. The driver with his foot presses down the treadle i, and holds it down until the car has been started, when he releases it, and it returns to its normal position by the reaction of the spring q.

When the treadle is forced down, it operates the bell-crank $j$ $k$, and through the connecting-rod $l$, rocks the toe or lifting-pieces L, which, in turn, in coming down, allow the ways G to swing down, also, upon their pivots.

Dropping the ways G allows the pull-pawl $e$ to drop, and its lower end to swing under the ratchet H, and ready to take into the first tooth of the ratchet that it comes against, the moment the draft or strain is applied. At the same moment that the pull-pawl $e$ thus drops and swings into position to act as above stated, the holding-pawl $p$, by means of the rod $o$, and its connection with the toe-pieces or their rock-shaft, is raised out of the ratchets on the wheel D. If, now, the team be started, the draw-bar A moves through the sheath $c$, and the power of the team is applied through the chain B to the wheel D, and the unwinding of the chain on said wheel winds up the other chains $b$ $b$, on their respective eccentrics E F, and draws forward the pull-pawl $e$, which, being engaged with the ratchet H, that is fast on the car-axle I, turns said axle and its wheels, and thus starts the car by means of the leverage so attained, at the expense, of course, of an increased distance that the team must move over, for while the team is moving, say four feet, the car may not move over two feet; but after it is once started, even a few inches, the inertia is overcome, and it can then be easily drawn by the team.

When the car is in motion the treadle is relieved, and allowed to rise up by the reaction of the spring $q$, the toe-pieces move up the ways G, and the pull-pawl $e$ rises with them, and, coming against the spring $f$, is swung out from the ratchet, and is prevented from rattling or swinging out of place thereby, and the pawl $p$ drops into its ratchets and there holds.

When the power is applied through the chains, as above stated, it is done against the action of a spring, J, which becomes strained by the drawing forward of the pull-pawl $e$ and the bars $h$, attached to the same shaft with it; and when the treadle is released, the reaction of this spring unwinds the chains $b$, and winds up the chain B, drawing the bar A back into the sheath $c$, and the pawl $p$ catches and holds all that is so wound up until the draw-bar gets back to its original position again.

That the pull-pawl $e$ may turn the ratchet-wheel H, and, consequently, the axle I, and the wheels thereon, as far as possible, the round rod $g$ in said pawl reaches far under the ratchet, and the roots of the ratchet-teeth are rounded out, so as to receive this round bar $g$, which, when the ratchet revolves so far as not to present any more holding surface to the line of draft, freely rubs out, though admits of a greater extent of revolution that the ordinary angled ratchets would admit of.

Figure 3:
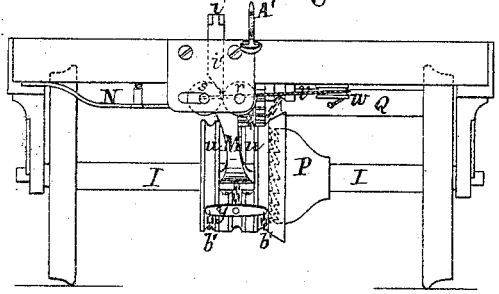
Figure 3 represents an elevation of one of the ends of the car.
Figure 4:
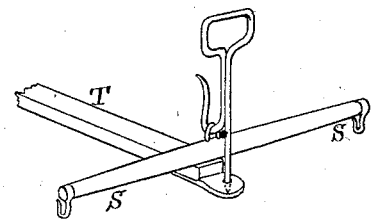
Figure 4 represents a device for holding the tongue and double-tree together, to facilitate their transportation from one end of the car to the other.

The modification of this starting apparatus shown at the left of the figs. 1 and 2, and by an end view at fig. 3, is substantially the same as that above described, the only difference being in the devices for operating some of the moving parts, as, for instance, the foot-treadle $i'$ is beveled off at its lower end, and passes between two rollers, one of which, $r$, is on a fixed journal, and the other, $s$, mobable in a slot, is upon a bent clutch-lever, M, that is pivoted at $t$ to the car-body or frame, and rests upon a spring, N, so that it may yield vertically thereon, if necessary.

The clutch-lever has, at its under or rear end, two yokes or collars, $u$ $u$, which surround a hub, O, that is loosely placed on the car axle I, and so surround it in grooves or recesses, that said hub may also turn in the yokes or collars $u$ $u$.

Permanently attached to the car-axle there is a semi-clutch, P, furnished with serrations, as shown by dotted lines in figs. 1 and 3, and the end of the hub O next to this semi-clutch is bell-mouthed, and furnished with counter-serrations, so that, when moved up to the part P, these nicks, notches, or serrations will interlock and form a clutch when the draw-bar is moving forward, and slip past each other when it is backed or the car moving forward, in a manner well known to mechanicians. This clutch serves the same purpose as the pull pawl and its ratchet, in the first-described plan.

There is connected to the clutch-lever M a cord or chain, $v$, which, after passing around a pulley, $w$, is fastened to a spring, Q, and connected with this spring, adjustably, there is a rod, $x$, that raises and lowers the pawl $p'$, putting it out of and into action with the ratchet-wheel D'.

The drag-bar A' is arranged in a sheath, $c'$, and has connected to it a chain, B', winding around the ratchet-wheel D'; and connected to the ratchet-wheel D', one upon each side of it, are the eccentrics E' F', to which the chains $b'$ $b'$ are attached.

The chains $b'$ $b'$ pass around in grooves or recesses in the hub O, and are united to an equalizing bar, $y$, and from a point at or near the center of said bar $y$ a single chain, $z$, passes up and over the hub O, and thence back to a spring, R, where it is fastened.

The equalizer $y$ can move on its central pivot, and thus equalize the draft on the two chains, which otherwise it might be very difficult to do, and if not uniform, would so strain and bind the parts operated by them as to render them not freely operative.

The operation of this special mechanism is the same as that first described, viz: The driver with his foot presses down the treadle $i'$. This throws in the clutch O P and raises the pawl $p'$. The team, now starting, pulls out the drag-bar A, the chain B' unwinds, and turns the eccentrics E' F', which wind up their chains $b'$ $b'$, and these chains, being united to the perimeter of the clutch, after passing around two thirds, more or less, of its circumference, turns the clutch and the axle and car-wheels with it, and the car is started with a power increased by the leverage of the chains over the wheels or pulleys, at a loss, of course, of forward motion, as before. When the foot-treadle is released, the reaction of the spring R returns the parts to their normal condition, and the pawl $p'$ holds them there, and takes up the slack of the chains, so that there is no rattling, shackling, or lost motion.

I have described this mechanism as a car-starting mechanism. It is also a holding mechanism, as, for instance, when a street-car stops on a steep up-grade, as often occurs. Now, unless there were some means of holding it there, it would run back and down the grade, but, by pressing upon the treadle and holding it, the front axle is locked from turning in the direction of the down grade, and, consequently, the car is held fast by the very devices which are to aid the team in starting it, when it is to be started; so it is a holding apparatus when the car is stopped, and a starting apparatus when it is to be moved.

The object in hinging and jointing the treadles is, that when they are not to be used, they may be raised up out of action, and laid flat upon the platform, so that no one could accidentally or otherwise apply them when not needed, as they are not at any time at the rear of the car, as the driver at front operates them.

The draft-chains $b$ $b'$ being attached to the eccentrics at the point of least eccentricity, the chain B must exert its greatest power at starting, when such power is most needed, and gradually diminish as the eccentrics increase and the car gets motion, until the larger portion of the eccentrics and the ratchet-wheel become of equal radius, when all increase of power from this cause or source ceases.

The eccentrics may be greater or lesser, and made to extend through an entire revolution of the wheel D, or even more, by drawing the chain B until it comes nearly or quite in line with the axis of the wheel D, by which the power is rapidly diminished, and by aid of the spring J a gradual and easy termination of all extra power is produced, whether the start be hard or easy.

Instead of purely eccentrics, the pieces E F or E' F' may be "heart" or "tappet-shaped" cams, as shown by detached figures in the drawings.

Having thus fully described my invention,

What I claim therein as new, and desire to secure by Letters Patent, is—

1. In connection with a car-starting or holding mechanism, the jointed and hinged treadle, arranged on the platforms, as described, to allow the driver, by his foot, to throw said mechanism into or out of action, substantially as described.

2. In combination with the treadle and its connections, for operating a holding and releasing-pawl, $p$ or $p'$, a combined ratchet-wheel, and eccentric wheels on each side of it, as and for the purpose described and represented.

3. In combination with the ratchet and eccentric wheels, a chain connecting the first to the draft, and the second to the mechanism that turns the car-axle, whether that mechanism be a draw-pawl and ratchet or a clutch and draw-chains, as described and represented.

4. In combination with the united ratchet and eccentrics, and their chains, the draw-bar and sheath, when so arranged that said draw-bar will always re-enter the sheath with its hook up, as shown, and for the purpose described.

5. In combination with a draw-bar and with the united ratchet and eccentrics, and their flexible attachments, a spring for taking up the slack of the chains, and a pawl for holding it when taken up, substantially as described.

GEO. P. FRICK.

Witnesses:
  DUNCAN VEAZEY,
  STANLEY WIER.